United States Patent [19]

Scott, Jr. et al.

[11] 4,105,962
[45] Aug. 8, 1978

[54] BATTERY CHARGER

[75] Inventors: Donald K. Scott, Jr., Waynesboro; Michael D. McIntosh, South Mountain, both of Pa.

[73] Assignee: Landis Tool Company, Waynesboro, Pa.

[21] Appl. No.: 739,681

[22] Filed: Nov. 8, 1976

Related U.S. Application Data

[63] Continuation of Ser. No. 560,947, Mar. 21, 1975, abandoned.

[51] Int. Cl.² .............................................. H02J 7/04
[52] U.S. Cl. ........................................ 320/32; 320/35; 320/39
[58] Field of Search ................. 320/32, 35, 36, 22–24, 320/39

[56] References Cited

U.S. PATENT DOCUMENTS

| 3,553,562 | 1/1971 | Woods ................................ 320/39 |
| 3,864,617 | 2/1975 | Smith et al. ...................... 320/32 X |
| 3,895,283 | 7/1975 | Peterson .......................... 320/36 X |

*Primary Examiner*—Robert J. Hickey
*Attorney, Agent, or Firm*—Spencer T. Smith; Brian L. Ribando

[57] ABSTRACT

A constant voltage battery charger comprising a voltage regulator adapted to be supplied with D.C. voltage having a predetermined, constant level, means for establishing a regulator output voltage predetermined to define, at a selected temperature, a charging voltage equal to the charging voltage of a battery at that temperature including an operational amplifier means for supplying a predetermined voltage to the non-inverting input of the operational amplifier, and variable means for supplying voltage as a function of regulator output voltage to the inverting input of the operational amplifier, the variable means being selectively variable over a given range so that the predetermined output voltage can be defined at the selected temperature.

4 Claims, 1 Drawing Figure

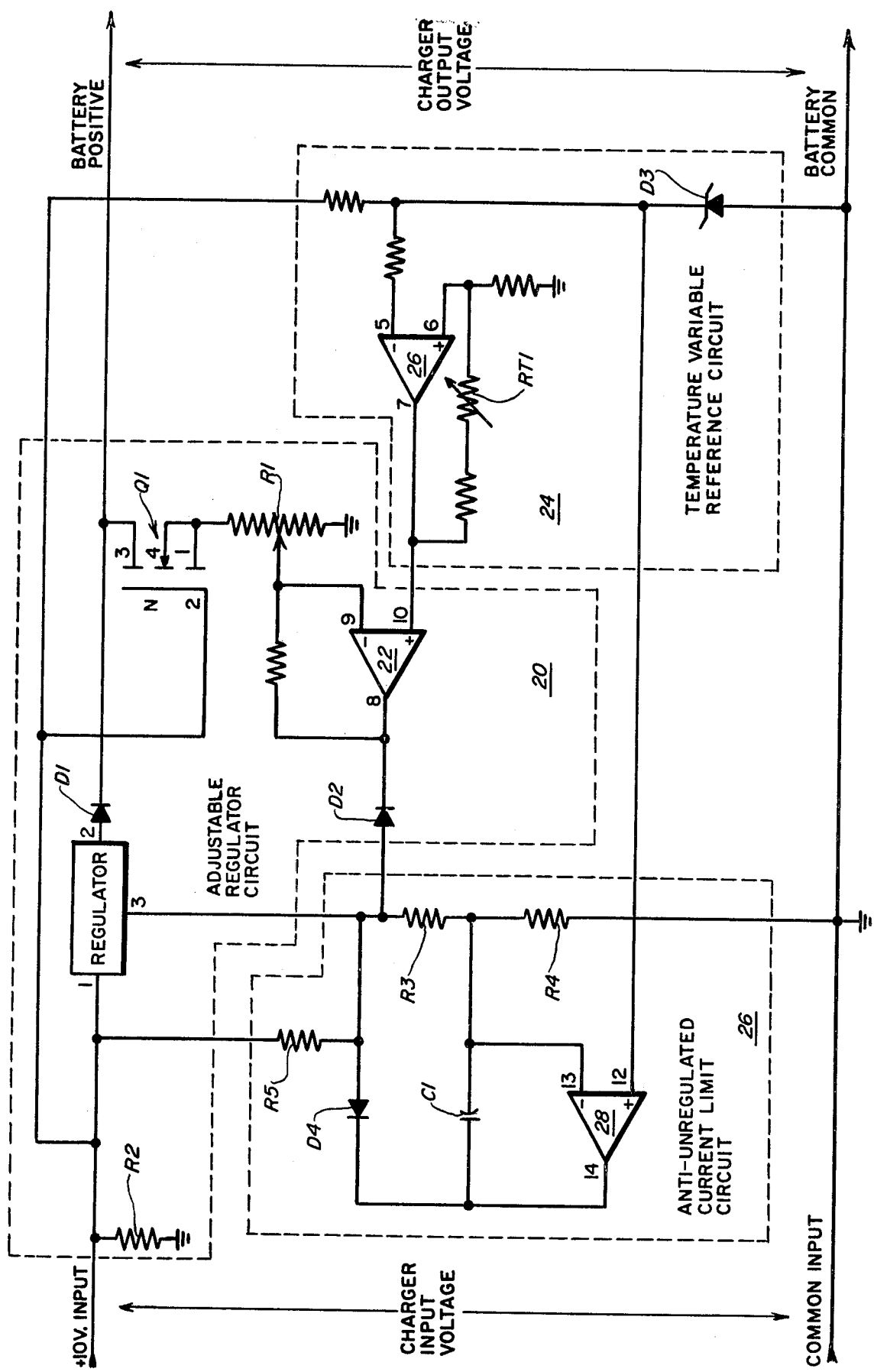

BATTERY CHARGER

This is a continuation of copending U.S. application Ser. No. 560,947, filed Mar. 21, 1975, now abandoned.

The present invention relates to battery chargers and more particularly to constant potential or constant voltage battery chargers.

It is an object of the present invention to provide a constant potential battery charger which will establish a constant voltage level to float-charge a sealed lead acid battery for long periods of time without damaging the battery.

It is another object of the present invention to provide a constant potential battery charger which will supply current to the battery proportional to the difference between the actual battery voltage and the required battery voltage.

It is a further object of the present invention to provide a constant potential battery charger which will not undercharge or overcharge a battery thereby maximizing battery life.

Other objects and advantages of the present invention will become apparent from the following portion of this specification and from the accompanying drawing which illustrates in accordance with the mandate of the patent statutes, a presently preferred embodiment incorporating the teaching of the invention.

Referring to the drawing:

The sole drawing is an electronic schematic of the battery charger made in accordance with the teachings of the present invention.

The battery charger is powered by a source of D.C. voltage, for example, a 10 volt source such as is readily available when the battery charger is used in conjunction with a machine tool or the like, and charges a battery which, for example, could be a three cell, sealed, lead acid battery which requires a charging voltage of 2.3 volts per cell at room temperature (22° C). The battery charger output voltage should accordingly be 6.90 volts at room temperature. Assuming a voltage drop of one-half volt across a rectifier diode D1, the output voltage at terminal 2 of the current limited 5 volt regulator of an adjustable regulator circuit 20 should be 7.40 volts at room temperature. If the input voltage (terminal 1) of this regulator is greater than 7 volts relative to the reference terminal (pin 3) of this regulator, the output voltage will be 5 volts above the same reference terminal. A voltage of 2.40 volts at reference terminal (pin 3) will accordingly result in the desired output voltage of 7.40 volts at terminal 2. Consequently, a voltage greater than 9.40 volts is required at the input (pin 1) of the regulator.

The adjustable regulator circuit 20 additionally includes a first high gain, internally frequency compensated operational amplifier 22. A temperature variable reference circuit 24 supplies the non-inverting input (pin 10) of this operational amplifier with a selected voltage, at room temperature, near the midpoint of the +10 volt input range (preferably 4.5) that supplies power to the operational amplifiers. Such a voltage is easily manipulated by the operational amplifier.

A variable resistor R1 is provided so that the voltage at the inverting input (pin 9), and hence, the output voltage of the operational amplifier (pin 8) can be selectively varied to precisely establish 2.40 volts, at room temperature, at the regulator reference (pin 3). The reference voltage will be equal to the output voltage of the operational amplifier less the voltage drop across a switching diode D2, which preferably is a germanium diode used in switching applications.

When the battery charger is supplied with the desired voltage input, a biasing voltage will be supplied to pin 2 (the gate) of an N-channel, enhancement mode MOSFET transistor Q1. Since the biasing voltage on pin 2 produces a very low impedance path from from pin 3, the drain, to pin 1, the source (typically 200 ohms) as compared with the very substantial resistance (50K, for example), of the variable resistor R1, Q1 may be treated as a short circuit from Battery Positive to the variable resistor R1 whenever power is on.

Once the output voltage of the charger is established by varying the resistance of the variable resistor R1, at room temperature, until a voltmeter reads 6.90 volts at the charger output, a battery may be connected to the charger. Any battery that is connected to the charger will require some charging. Assuming that the battery needs a small amount of charging, the connected battery will pull the charger output voltage down by drawing more current through the rectifier diode D1 and causing the voltage drop thereacross to increase. Any voltage drop at the BATTERY POSITIVE output will cause a voltage drop at the inverting input (pin 9) of the operational amplifier 22 and a concomitant increase in the operational amplifier output voltage (pin 8). This will cause the voltage at the regulator reference (pin 3) to increase thereby increasing the output voltage (pin 2) of the regulator to compensate for the increased voltage drop across the rectifier diode D1, thus raising the charger output voltage to 6.90 volts.

As the battery becomes charged, the current through, and the voltage drop across the rectifier diode D1, decreases and the charger output voltage increases. Any rise in charger output voltage increases the voltage supplied to the inverting input and decreases the output voltage of the operational amplifier. The charger output voltage will accordingly be regulated or maintained at 6.90 volts.

The transistor Q1 and rectifier diode D1 prevent the discharge of a connected battery into the charger whenever there is no charger input voltage. The rectifier diode D1 prevents the battery from discharging back through the regulator and the transistor Q1 will maintain an extremely high impedance from pin 3 to pin 1 when power is off to prevent the battery from discharging through the variable resistance R1. The resistor R2 attached to the +10 volt INPUT and to COMMON ensures that the transistor Q1 will be off when the charger is not supplied with the desired 10 volt input.

The temperature variable reference circuit 24 includes a variable gain internally frequency compensated operational amplifier 26 and a temperature compensated low voltage reference diode D3 having a voltage drop of 1.22 volts at a reverse current of 1 milliamp. The gain of this second operational amplifier, at room temperature, is selectively chosen so that its output voltage (the voltage supplied to the non-inverting input of the first operational amplifier 22) will be 4.50 volts.

To prevent the overcharge or undercharge of a battery at temperatures other than room temperature, a charging temperature coefficient is introduced into the battery charger. For the three cell sealed lead acid battery which requires a charging voltage, at room temperature of 6.90 volts, the charging voltage should be derated (for example, at a rate of 5 millivolts per cell, per degree centigrade arise in temperature). Therefore, in this example, a charger operating at 6.90 volts at 22° C room temperature and charging a three cell battery, should derate its output voltage at a rate of 0.015 volts per degree centigrade rise in temperature. Consequently, a rise of 28° C from 22° C to 50° C, should cause the charger to derate 0.42 volts. As a result, a charger should produce 6.48 volts at 50° C in this example. This means that the output voltage of the first operational amplifier 22 must decrease with ambient temperature to cause the charger output to decrease for a temperature rise and vice versa.

To achieve this result, the gain of the second operational amplifier 26 is selectively varied by a thermistor RT1 having a selected temperature to resistance relationship which will provide the desired output voltage (4.50 volts) at pin 7, at room temperature, and a decreasing output voltage with increasing temperature. This means that the temperature variable gain of the second operational amplifier 26 is chosen so that an increase in temperature to 50° C will cause a sufficient decrease in output voltage at pin 7 of the second operational amplifier 26 to cause a charger output voltage of 6.48 volts.

The five volt regulator requires an input voltage of from 7 to 35 volts with respect to reference (pin 3 of the regulator) in order to supply an output voltage of 5 volts relative to reference. Accordingly, if the voltage at pin 3 of the regulator increases to beyond 3 volts, such as would occur when a battery requiring large amounts of current to charge is connected to the charger, the regulator will operate in an unregulated current limit mode with only a trickle of current charging the battery. To prevent the voltage at pin 3 of the regulator from exceeding 3 volts and to thereby assure battery charging in a reasonable amount of time, an anti-unregulated current limit circuit 26 is provided.

The anti-unregulated current limiting circuit 26 includes a third high gain internally frequency compensated operational amplifier 28. The voltage supplied to the non-inverting input (pin 12) of this operational amplifier is set at a predetermined level (1.22 volts) by the temperature stable reference diode D3. The voltage supplied to the inverting input (pin 13) of the third operational amplifier 28 is controlled by a voltage divider R3, R4, which establishes a voltage of 1.22 volts at the inverting input when the reference voltage of the regulator is 3 volts. When the output voltage of the adjustable regulator circuit amplifier 22 increases beyond a point which would normally elevate the voltage at pin 3 of the regulator to beyond 3 volts, the inverted input voltage (pin 13) of the third operational amplifier 28 will exceed the voltage at the non-inverting input (pin 12) of the third operational amplifier 28 causing the output voltage (pin 14) to switch from its normally high 10 volt output toward zero volts. As pin 14 switches toward zero volts, the regulator reference (pin 3) is pulled toward zero volts through the second switching diode D4. This action occurs even though pin 8 of the first operational amplifier 22 is high since the switching diode D2 becomes reverse biased. The greater the voltage at pin 8, the nearer to zero volts will be the output voltage at pin 14 of the third operational amplifier to maintain the reference voltage at or below 3 volts to assure that the regulator will function in the regulated mode.

As the battery charges, the battery voltage will increase. As it does, the output voltage of the first operational amplifier 22 will drop until the first switching diode D2 is actually pulling reference voltage lower than a second switching diode D4. As this happens, the voltage at pin 13 of operational amplifier 28 is lower than that at pin 12, and therefore, pin 14 switches high to its normal 10 volt output. Switching diode D4 prevents the high output (pin 14) of operational amplifier 28 from having any effect on the reference voltage since it is reverse biased. The resistor R5 provides a current path other than through the regulator for the divider network and the capacitor C1 causes the switching action from low to high, or high to low of pin 14 to be rapid. The ANTI-UNREGULATED CURRENT LIMIT CIRCUIT, accordingly, ensures that a battery will be charged efficiently and in a minimum amount of time.

What is claimed is:
1. A constant voltage battery charger comprising
a three terminal voltage regulator having input, output and reference terminals adapted to be supplied with D.C. voltage having a predetermined, constant level,
means for continuously varying the reference voltage with the amount of charge required to establish a constant charging voltage whereby the rate of charge of a battery will be continuously variable with the state of charge of the battery,
said continuously varying means including,
an operational amplifier,
means for supplying a predetermined voltage to the noninverting input of said operational amplifier comprising a second operational amplifier and means for selectively varying the gain of said second operational amplifier as a function of temperature,
means for supplying voltage as a function of regulator output voltage to the inverting of said operational amplifier, said inverting input voltage supplying means including means for selectively varying said inverting input voltage over a given range so that a predetermined output voltage can be defined at a selected ambient temperature, and means for supplying the output voltage of said operational amplifier to said reference terminal.

2. A constant voltage battery charger comprising
a three terminal voltage regulator having input, output and reference terminals adapted to be supplied with D.C. voltage having a predetermined, constant level,
means for continuously varying the reference voltage with the amount of charge required to establish a constant charging voltage whereby the rate of charge of a battery will be continuously variable with the state of charge of the battery,
said continuously varying means including,
an operational amplifier,
means for supplying a predetermined voltage to the noninverting input of said operational amplifier,
means for supplying voltage as a function of regulator output voltage to the inverting input of said operational amplifier,
said inverting input voltage supplying means including means for selectively varying said inverting input voltage over a given range so that a predetermined output voltage can be defined at a selected ambient temperature,
said inverting input voltage varying means comprising switch means, and
means for opening said switch means when said three terminal regulator is not supplied with the D.C. voltage having said predetermined, constant level, and means for supplying the output voltage of said operational amplifier to said reference terminal.

3. A constant voltage battery charger according to claim 2, wherein said switch means comprises a transistor selectively biased by said predetermined D.C. voltage.

4. A constant voltage battery charger comprising a three terminal voltage regulator having input, output and reference terminals adapted to be supplied with D.C. voltage having a predetermined, constant level, means for continuously varying the reference voltage with the amount of charge required to establish a constant charging voltage whereby the rate of charge of a battery will be continuously variable with the state of charge of the battery, means for preventing the reference voltage of said three terminal voltage regulator from exceeding a predetermined level, said preventing means comprising, a second operational amplifier, means for supplying a predetermined voltage to the non-inverting input of said second operational amplifier, means for supplying a voltage to the inverting input of said second operational amplifier equal to the voltage supplied to the non-inverting input thereof when the reference voltage equals said predetermined level, and means for increasing the voltage supplied to the inverting input of said second operational amplifier as said reference voltage increases above said predetermined level, said continuously varying means including, an operational amplifier, means for supplying a predetermined voltage to the noninverting input of said operational amplifier, means for supplying voltage as a function of regulator output voltage to the inverting input of said operational amplifier, said inverting input voltage supplying means including means for selectively varying and inverting input voltage over a given range so that a predetermined output voltage can be defined at a selected ambient temperature, and means for supplying the output voltage of said operational amplifier to said reference terminal.

* * * * *